Jan. 9, 1923.

W. J. D. RUSSELL.
AUTOMOBILE COMMODE.
FILED AUG. 1, 1919.

1,441,244

2 SHEETS-SHEET 1

Inventor
W. J. D. Russell
By J. R. Kelly
his Attorney

Jan. 9, 1923.
W. J. D. RUSSELL.
AUTOMOBILE COMMODE.
FILED AUG. 1, 1919.
1,441,244
2 SHEETS-SHEET 2
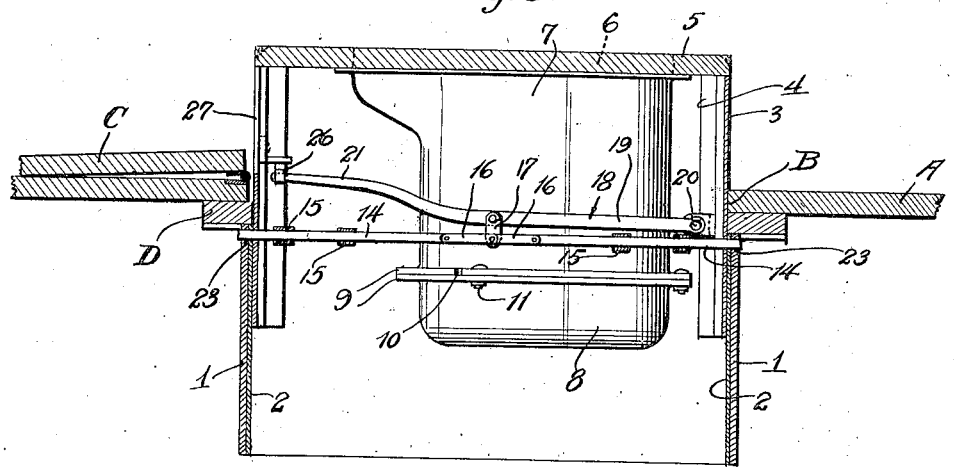
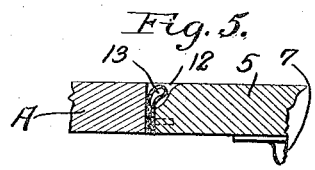
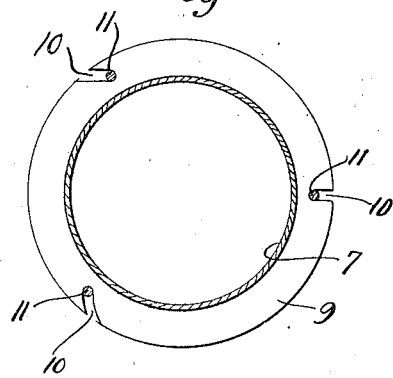
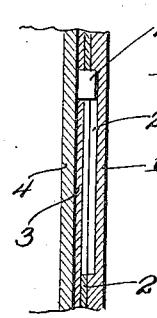
Inventor
W. J. D. Russell
By J. R. Kelly
his Attorney Patented Jan. 9, 1923.

1,441,244

UNITED STATES PATENT OFFICE.

WILLIAM J. D. RUSSELL, OF ALAMO, INDIANA.

AUTOMOBILE COMMODE.

Application filed August 1, 1919. Serial No. 314,618.

*To all whom it may concern:*

Be it known that I, WILLIAM JACOB DICKSON RUSSELL, a citizen of the United States, residing at Alamo, Indiana, have invented new and useful Improvements in Automobile Commodes, of which the following is a specification.

This invention relates to automobile equipments and more particularly to a commode which may be installed in automobiles particularly touring cars, for use by the occupants of the car while touring.

The primary object of the invention is to provide an apparatus of this character which may be installed with very little cost and which will occupy none of the passenger space when not in use and which will be especially adapted for the comfort of children while touring.

The above and additional objects are accomplished by such means as are illustrated in the preferred embodiment and in the accompanying drawings, wherein like characters denote like or corresponding parts throughout the several views, in which—

Figure 1:
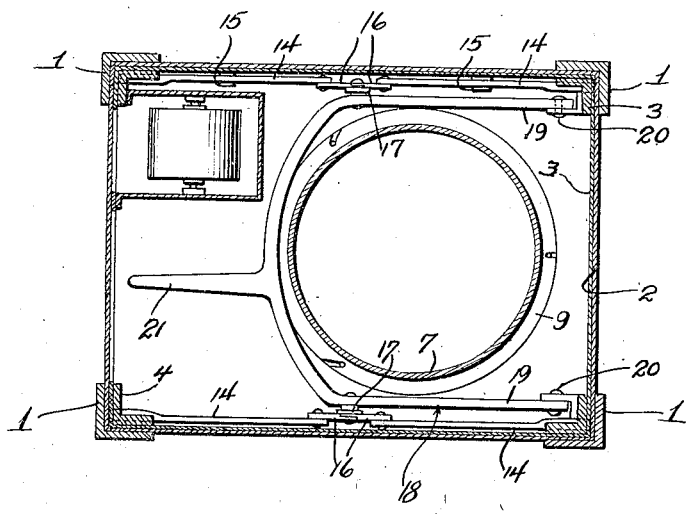
Figure 2:
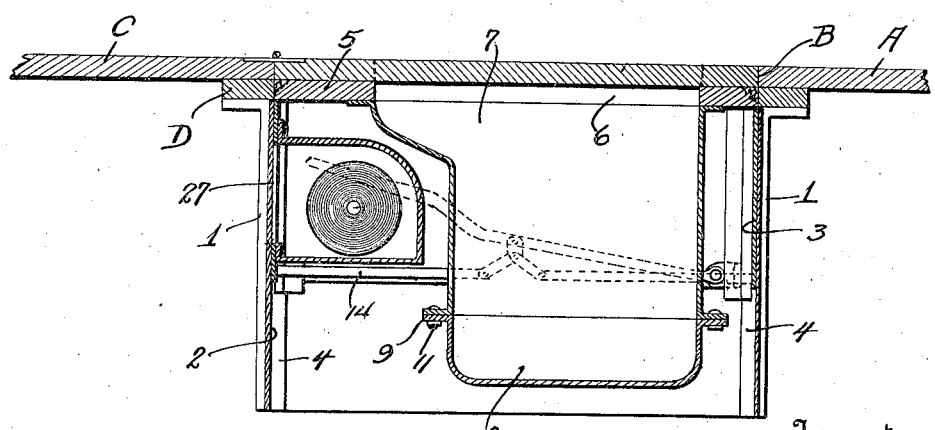

Figure 1 is a horizontal sectional view of the detached commode. Figure 2 is a vertical sectional view of the commode as attached to a car floor and in its normal, covered, position below same. Figure 3 is a similar sectional view showing the commode elevated above the car floor ready for use. Figure 4 is a cross section of the container, showing the slotted bottom flange of the latter. Figure 5 is a sectional detail showing one of the lifting means for raising the inner container of the device, and Figure 6 is a sectional detail disclosing a groove guide and the container lug or stop slidable therein for limiting the elevation of the commode.

Referring to the drawings, wherein is illustrated the preferred form of my invention, in which like characters of reference indicate like or corresponding parts throughout the several views, the floor A of the touring car or automobile is provided with a square opening B which is normally closed by a hingedly mounted door C. A reinforcing frame D may be employed to extend around the opening beneath the floor to reinforce the same. Attached to the floor or the frame D are the four guide members or corner posts 1 shown to advantage in Fig. 1 and these may be constructed in any preferred manner, but in the present instance, are shown as consisting of angle irons. A casing or boxing 2 is attached to these posts and is preferably constructed of thin sheet metal thereby forming a housing having its bottom open. Mounted within the housing is an inner casing 3 which is also constructed of thin metal and is braced by the corner posts 4, which as shown in Fig. 1 are also constructed of angle iron. These two casings are telescopically connected together so that relative movement of the two casings will be permitted. Mounted on the top of the posts 4 is a seat 5 having the opening 6. This seat when the device is closed, will be disposed beneath the door C as shown to advantage in Fig. 2. Attached to and suspended from the seat is the substantially cylindrical container 7 having a removable bottom 8, the removable bottom and main container being provided with complementary flanges 9 which may be bolted together to maintain the portion 8 in position. As shown in Fig. 4, the flange of one of the members is slotted as indicated at 10 while the other flange is provided with bolt holes and the bolts 11 are extended through the bolt holes and slots and are provided with nuts in the usual manner. With this arrangement of slots it is possible to remove one of the bolts after which the lower portion 8 of the receptacle may be removed by sliding the removable portion off the bolt 11. This arrangement permits the container to be used with its bottom either open or closed.

The forward and rear edge of the seat 5 is provided with a recess 12 and attached to the edge of the seat at the front and back thereof and disposed in the corresponding recess is a finger grip 13 which may be grasped when the door C is opened to raise the device above the floor level as shown in Fig. 3.

To maintain the apparatus in open position I have provided a locking arrangement which consists of the sliding bolt 14, slidably mounted in bearings 15 and arranged in pairs at opposite sides of the casing. The meeting ends of each pair are connected to the links 16 and the meeting ends of the links are joined by link 17 to an operating lever 18. The operating lever consists of the parallel arms 19 pivoted as indicated at 20, and these arms extend around the front of the container 7 and have a forwardly projecting handle 21. Normally, the sliding bolts and lever are in the position shown by dotted lines in Fig. 2 and the ends of the sliding bolts are in sliding contact with the inner surface of the casing 2.

When the device is elevated to the position shown in Fig. 3, the sliding bolts will register with openings 23 formed in the outer casing and the weight of the handle structure will press downwardly on the links and cause registration of the bolts with the openings 23 so that the device will be held in elevated position.

To limit the upward sliding movement of the inner casing one of the posts is slotted as indicated at 24 and this slot receives a lug 25 carried by the sliding casing.

A spring clip, of any preferred type, is indicated at 26 and is adapted to engage the end of the handle 21. The front wall of the sliding casing is open at 27 so that access may be had to the handle 21 and a paper holder is also arranged within the sliding casing at a point near the opening 27.

From the foregoing it will be noted that I have described one form of the invention but I desire it to be understood that various changes and alterations in the structure, which fall within the scope of the claims, may be made without departing from the spirit of the invention.

Having thus fully described my invention, what I claim as new and desire to secure by Letters Patent is:

1. An apparatus of the character described comprising a support, a fixed casing attached to said support, an inner casing slidably mounted in said fixed casing, a container carried by said slidable casing, a plurality of posts carried by said slidable casing, an operating handle pivotedly mounted at one end to certain of said posts and accessible from the outside of said casings, slidably mounted bolts carried by said posts, and means connecting the inner end of said bolts and said handle, and said outer casing having openings to receive the free ends of said bolts when the inner casing is elevated to support the latter in such position.

2. An apparatus of the character described comprising a fixed casing, an inner casing slidably mounted in said fixed casing, a container carried by said slidable casing, a plurality of posts carried by said slidable casing, said posts being provided with through openings, an operating handle pivotedly mounted at one end to certain of said posts and accessible from the outside of said casings, a plurality of bolts slidably mounted through the opening in said posts, means connecting the inner end of said bolts and said handle, and said outer casing having openings to receive the free ends of said bolts when the inner casing is elevated to support the latter in such position.

W. J. D. RUSSELL.

Witnesses:
   MARTIN PARRETT,
   JESSE CLOSE.